Aug. 16, 1927.
H. B. HATTON, JR
1,639,431
GAS CONTROL COCK
Filed April 29, 1926
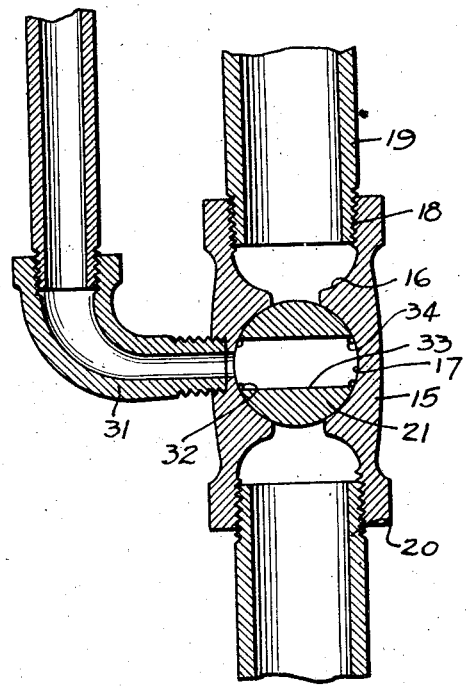
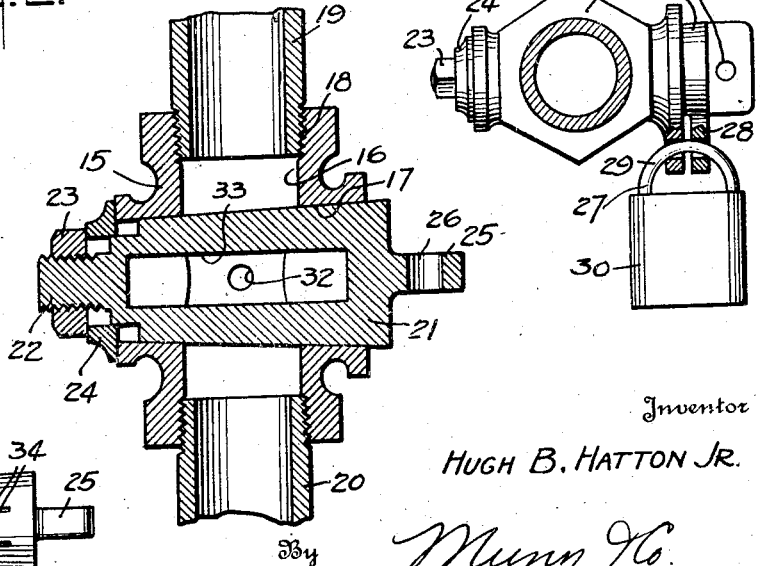
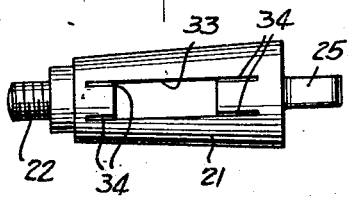
Inventor
HUGH B. HATTON JR.
By Munn & Co.
Attorney Patented Aug. 16, 1927.

1,639,431

UNITED STATES PATENT OFFICE.

HUGH B. HATTON, JR., OF GLENDALE, CALIFORNIA.

GAS-CONTROL COCK.

Application filed April 29, 1926. Serial No. 105,551.

My invention relates to gas control cocks as used in gas lines for controlling the flow of gas from a main to a meter, and a purpose of my invention is the provision of a gas control cock having means by which any leakage of gas around the cock when the latter is in closed position will be vented to atmosphere and at a point exteriorly of the building in which the gas cock is located, so as to prevent leakage of gas into or beneath the building and to thereby eliminate the possibility of explosion and fire.

I will describe only one form of gas cock embodying my invention and will then point out the novel features thereof in claims.

In the accompanying drawings;

Figure 1 is a view showing in vertcal section one form of gas control cock embodying my invention in applied position to a gas line;

Figure 2 is a view similar to Figure 1 but taken at right angles thereto;

Figure 3 is a top plan view of the control cock shown in the preceding views;

Figure 4 is a detail plan view of the valve embodied in the control cock shown in the preceding views.

Referring to the drawings, my invention, in its present embodiment, comprises a metallic body 15 having a duct 16 extending therethrough with the walls of the duct constructed to provide a valve seat 17. The walls of the duct at the ends thereof are interiorly screw threaded as indicated at 18 for the threaded reception of the confronting ends of the sections 19 and 20 of a gas line, it being understood that the section 19, for example, is connected to a gas main (not shown) while the pipe section 20 is connected to a gas meter (not shown). Rotatable within the valve seat is a valve 21 consisting of a tapered body to fit within the tapered seat 17 and provided at one end with a reduced and screw threaded extension 22 engaged by a nut 23 for securing the valve against displacement from the body, an interposed washer 24 permitting rotation of the valve within the seat to occupy a closed position or an open position. The opposite ends of the valve are provided with an ear 25 having an opening 26 in which a suitable tool is adapted to be received for rotating the valve to open or closed position.

As shown in Figure 3, the valve body 15 is provided with an ear 27, while the valve 21 is likewise provided with an ear 28. Both of these ears are formed with openings which are adapted to register in the closed position of the valve so as to permit the extension therethrough of the hasp 29 of a padlock 30 for locking the valve in closed position.

As shown in Figure 1, a vent pipe 31 is provided with an end which threadedly engages within the body 15 so as to have communication with a ventport 32. In the closed position of the valve 21, its port, indicated at 33, registers with the vent port 22 and it is to be particularly noted that the valve 21 must be in full open and full closed position before such registration is effected. This vent pipe 31 may extend to a point exteriorly of a building should the control cock be located beneath or within a building, or the vent pipe may have communication with a pressure regulator and through the latter to atmosphere. In either instance, the vent pipe is designed to discharge any gas entering the same into the atmosphere, and when the valve is in closed position, should any leakage of gas around the valve occur, it will be clear that such gas will be discharged into the vent pipe and ultimately to atmosphere.

In order to insure of all gas leaking around the valve entering the vent pipe through the port 32, the periphery of the valve as shown in Figure 4 is formed with grooves or channels 34 which are in communication at their inner ends with the port 33, while their outer ends terminate short of the ends of the valve. These grooves or channels operate to conduct gas leaking around the periphery of the valve to be discharged into the port 33 and, hence, into the vent pipe through the port 32.

It is to be particularly noted that the dimensions of the port 33 are such that with the valve 21 in full or part open position the port will be out of registration with the vent port 32, so that the possibility of gas being discharged into the vent pipe when the valve is in open position will be prevented.

Although I have herein shown and described only one form of gas control cock embodying my invention, it is to be understood that various changes and modifications may be made therein without departing from the spirit of the invention and the spirit and scope of the appended claims.

I claim as my invention:

1. In combination, a gas line, a control cock therein, and a vent pipe correlated with respect to the control cock to discharge to atmosphere gas which may leak past the valve when the latter is in closed position, to thereby prevent the passage of gas into the line beyond the valve.

2. A gas control cock comprising a body adapted to be connected in a gas supply line to a building having a duct therethrough, a valve seat in the walls of the duct, a vent port in the valve seat, a vent pipe communicating with the vent port, a valve rotatable in the valve seat having a port therein to aline with the duct when in open position and to aline with the vent port when in closed position whereby leakage of gas past the valve will be vented to atmosphere through the vent pipe, to thereby prevent the passage of gas into the pipe line beyond the valve.

3. A gas control cock comprising a body having a duct therethrough, a valve seat in the walls of the duct, a vent port in the valve seat, a vent pipe communicating with the vent port, a valve rotatable in the valve seat having a port therein to aline with the duct when in open position and to aline with the vent port when in closed position whereby leakage of gas past the valve will be vented to atmosphere through the vent pipe, and channels in the periphery of the valve communicating with the port therein for conducting gas which may leak around the valve to the port.

4. A gas control cock comprising a body having a duct therethrough, a valve seat in the walls of the duct, a vent port in the valve seat, a vent pipe communicating with the vent port, a valve rotatable in the valve seat having a port therein to aline with the duct when in open position and to aline with the vent port when in closed position whereby leakage of gas past the valve will be vented to atmosphere through the vent pipe, channels in the periphery of the valve communicating with the port therein for conducting gas which may leak around the valve to the port, and ears on the body and valve having openings adapted to register when the valve is in closed position so as to receive a lock.

5. A gas control cock as embodied in claim 2 wherein the port of said valve and said vent port are such that they register only when the valve is in fully closed position.

6. A gas control cock as embodied in claim 2 wherein the port of said valve and said vent port are such that they register only when the valve is in fully closed position, and means for locking the valve in fully closed position.

7. A gas control cock comprising a body having a duct there through, a valve seat in the walls of the duct, a vent port in the valve seat, a vent pipe communicating with the vent port, a valve rotatable in the valve seat having a port therein to aline with the duct when in open position and to aline with the vent port when in closed position whereby leakage of gas past the valve will be vented to atmosphere through the vent pipe, and means for conducting gas which may leak around the valve to the port.

HUGH B. HATTON, Jr.